(12) United States Patent
Matle

(10) Patent No.: US 12,139,386 B2
(45) Date of Patent: Nov. 12, 2024

(54) CONTAINER-HANDLING APPARATUS

(71) Applicant: KHS GMBH, Dortmund (DE)

(72) Inventor: Oliver Matle, Seibersbach (DE)

(73) Assignee: KHS GmbH, Dortmund (DE)

( * ) Notice: Subject to any disclaimer, the term of this patent is extended or adjusted under 35 U.S.C. 154(b) by 127 days.

(21) Appl. No.: 17/925,656

(22) PCT Filed: Jun. 15, 2021

(86) PCT No.: PCT/EP2021/066013
§ 371 (c)(1),
(2) Date: Nov. 16, 2022

(87) PCT Pub. No.: WO2021/259693
PCT Pub. Date: Dec. 30, 2021

(65) Prior Publication Data
US 2023/0183051 A1    Jun. 15, 2023

(30) Foreign Application Priority Data

Jun. 25, 2020   (DE) ..................... 10 2020 116 779.2

(51) Int. Cl.
*B65G 17/06* (2006.01)
*B67C 7/00* (2006.01)
*B67C 3/26* (2006.01)

(52) U.S. Cl.
CPC .......... *B67C 7/0046* (2013.01); *B65G 17/066* (2013.01); *B67C 2003/2657* (2013.01)

(58) Field of Classification Search
CPC ..................... B65G 17/066; B67C 2003/2657
See application file for complete search history.

(56) References Cited

U.S. PATENT DOCUMENTS

| 2,029,823 | A |   | 2/1936 | Huntley et al. |
| 3,978,900 | A | * | 9/1976 | Mencacci ............. B67C 7/0046 |
|           |   |   |        | 141/172 |
| 4,664,159 | A | * | 5/1987 | Dugan .................... B67C 3/007 |
|           |   |   |        | 141/145 |
| 2017/0001848 | A1 | * | 1/2017 | DiCarlo .................... B67C 3/24 |

FOREIGN PATENT DOCUMENTS

| DE | 19882452 C2 | 12/2003 |
| DE | 102009017109 A1 | 10/2010 |
| EP | 3640198 A1 | 4/2020 |
| WO | 2018145777 A1 | 8/2018 |

* cited by examiner

*Primary Examiner* — Jason K Niesz
(74) *Attorney, Agent, or Firm* — Laurence A. Greenberg; Werner H. Stemer; Ralph E. Locher

(57) ABSTRACT

A container-handling apparatus, in particular a filling machine for filling cans or similar containers with liquid contents, has a first transporter for a container infeed, a downstream rotor with a plurality of handling positions for handling the containers, and a second transporter downstream of the rotor and forming a container outfeed. The second transporter is a chain conveyor with at least one guide finger having first and second guide portion, which receives the as yet unsealed containers and guides them by the first guide portion initially along a first, at least partially curved transport path portion, continuously in contact with a guide rail, before the second guide portion of the guide finger then conveys the container on a straight, second transport path portion along the container treatment path.

18 Claims, 4 Drawing Sheets

CONTAINER-HANDLING APPARATUS

FIELD AND BACKGROUND OF THE INVENTION

The invention relates to a container-handling apparatus, in particular a filling machine for filling cans or similar containers with liquid contents. Container-handling machines, in particular filling machines for filling cans, and in particular for the pressure-filling of cans with liquid contents are known to the person skilled in the art in the most widely differing forms. In this situation, the cans are conveyed to the filling machine by way of a transporter designed as a designer infeed, then transferred to a rotor, arranged downstream in the handling direction and circulating about a machine axis, and then conveyed away by means of a second transporter again arranged downstream in the handling direction and designed as a container outfeed.

A plurality of transport elements can be provided along a container-handling line configured in this way, such as is realised in a filling machine, which are each driven such as to rotate about a vertical machine axis, which are connected to one another for the purpose of transport and form the container-handling line, such that a container, in particular a can, is conveyed by forwarding from one transport element being driven such as to circulate to another transport element connecting to it along a container-handling line which is deflected a number of times.

In this situation provision can also be made for the adjacent transport elements to be a transport element rotating in a circulating manner, and a transport element adjacent to this conveying the containers in a linear manner. Such transport elements are also formed in the filling machine. In particular, the container outfeed can take the form of a transfer star or linear conveyor, by means of which the cans, filled but still open, are conveyed onward to a closing device, such as a can closing device.

With the transport elements designed as linear conveyors, the containers are transported essentially in a straight line, or, alternatively, also in the form of a curve, and essentially also without a change in their locational height. Such transport elements designed as linear conveyors can also be arranged between two transport elements designed as rotating transport elements.

During the forwarding of the cans inside the filling machine, from one transport element to a transport element following in the handling direction, configured, for example, as a container outfeed, there are frequently changes in the curvature in the movement path of the cans, and therefore changes in the centrifugal acceleration taking effect on the cans. With a high container throughput (number of cans being conveyed per time unit), the respective individual cans thereby undergo a transverse jolt, caused by high acceleration forces, which can lead to the filling contents slopping out of the mouth of the can.

As well as this, filling machines designed as can fillers of the prior art, and can closing devices located downstream in the handling direction frequently also exhibit a different division arrangement. This leads to the cans necessarily being accelerated to a higher speed at the handover to the transporter between the can filler and the downstream can closing device. This acceleration, too, is jointly responsible for the slopping behaviour of the cans, which at this time are still not closed. Overall, this is undesirable and disadvantageous in particular from hygienic considerations but also due to the loss of product.

In practice, therefore, the overall capacity of the filling machines affected, in particular of can filling machines, and/or also of closing machines, is reduced to the point at which slopping of the open cans along the container handling line no longer occurs. In the final analysis, this procedure leads to substantial performance losses (cans filled per hour), which is extremely undesirable due to the financial effects incurred.

In this respect, with the prior art the cans which are still open are guided in a linear manner, in particular exclusively in a linear manner, out of the rotor of the filling machine at a tangential point at a container outfeed, and conveyed onwards by means of a transporter downstream of the filling machine.

For this purpose, the containers, still not closed, are held when leaving the filling machine by what is referred to as a guide finger or a chain carrier of the transporter downstream in the filling machine in the direction of the closing device, and then moved by this chain carrier in the direction of the closing device. In this situation, the containers are actively pushed by the chain carrier on a transport plane of the transporter, as a result of which the containers are always in contact with the chain carrier and, at the same time, are positioned correctly for the division procedure.

During their movement in the direction of the closing device, as a rule the containers stand on a chain conveyor of the transporter, being driven in the transport direction, wherein what are referred to as guide rails are arranged on both sides of the chain conveyor, which on the one hand prevent the containers falling sideways out of the chain conveyor. On the other hand, the guide rails are formed in such a way that they force the containers onto a particularly advantageous movement path which reduces the slopping effect.

In this situation, in order to avoid the containers becoming jammed and to avoid any major friction, it is essential that the width of the guide rails is greater than the diameter of the container; the guide rail and the container therefore exhibit a sufficient degree of play between one another.

This degree of play, however, increasingly incurs a problem, since the containers, due to this play, do not always follow exactly the optimum movement path, but rather, during their movement, sometimes tend towards the inner guide rail, and sometimes towards the outer guide rail, and therefore do not carry out an optimum movement, which then leads to slopping, which is very undesirable.

From the printed publication DE 198 82 452 C2, a conveying apparatus is known for containers from a filling machine to a folding machine in a filling and folding system. This conveying apparatus comprises: A rotating filling machine, to which empty containers are delivered by means of a straight line conveyor and a conveyor star; a rotating folding or closing machine, which receives the filled containers by way of a second conveyor, such that they are closed and conveyed in the direction of an outfeed region; a profiled guide element; at least one fixed contact surface; a second conveyor of the type with a closed chain, which is provided with carrier elements or conveyor elements configured in such a way that, due to interaction with the profiled guide element, they remove the individual containers from the filling machine and bring them to the infeed point of the rotating folding or closing machine. In this situation, this conveying apparatus is characterised in particular in that the apparatus contains two fixed contact surfaces, and each carrier element or conveyor element is provided with a carrier base surface, arranged on the same plane as the contact surfaces and positioned between the lateral parts of the carrier element or conveyor element, in order to guide the containers from one fixed contact surface to another.

SUMMARY OF THE INVENTION

Taking this as a basis, the object of the invention is to provide a container-handling apparatus, in particular a filling machine for filling cans or similar containers with a liquid filling product, by means of which the transport of the containers along the container handling line can be achieved with the minimum possible transverse jolting and with a greater capacity (containers per time unit) of the container-handling apparatus.

This object is solved by a container-handling apparatus, in particular a filling machine for filling cans or similar containers with a liquid filling product, according to the features as claimed. The dependent claims relate to particularly advantageous further embodiments of the invention.

According to one major aspect, the invention relates to a container-handling apparatus, in particular a filling machine for filling cans or similar containers with a liquid filling product along a container handling line running in a handling direction.

In this situation, the container-handling apparatus comprises a first transporter, configured as a container infeed, a rotor, downstream in the handling direction and circulating about a machine axis and with a plurality of handling positions for handling the containers, and a second transporter, again located downstream of the rotor in the handling direction and configured as a container outfeed.

The transporter is configured in this situation as a chain conveyor, which comprises, on conveying means driven so as to be endlessly circulating, at least one guide finger, moving together with the conveying means, with a first and a second guide portion, which takes over the containers which have been treated at the plurality of handling positions of the rotor and are still not closed, and is configured such as to guide the containers with a first guide portion first along a first transport line portion, which at least in parts is curved, of the second transporter, in contact throughout with a guide rail, in a handling direction, before the guide finger conveys the respective container by means of its second guide portion on a straight second transport line portion along the container handling line in the handling direction, in a defined position.

In other words, therefore, the guide finger according to the invention of the second transporter is configured in such a way that, on the one hand, it constantly presses the containers, along the curved transport line portion, against one of the guide rails, and, on the other, nevertheless still transfers the containers in the correct dividing arrangement and in a defined position, i.e. a correct position, to the closing device downstream of the second transporter.

In particular, in this situation the second guide portion of the guide finger is configured as a concave transport pocket, which, even at high transport speeds of the second transporter, i.e. at high capacity, positions the containers precisely, i.e. in a defined position on the rotating plate in the closing machine. In the case of can transfer tables with outfeed curves, the cans must be able to run along on one surface. Despite this, and in particular with high capacities, the cans must still be positioned precisely onto the can dividers of the closing device. It is exactly this which is achieved in a simple manner with the concave transport pocket. Overall, by way of the conveyor-handling apparatus according to the invention, advantageously both the problem of guiding at the guide rails is solved, as well as the problem of positioning in a defined desired reference position of the containers before their handover to a closing device downstream of the second transporter.

According to an advantageous embodiment variant, provision can be made in this situation for the second transporter to comprise, at least in the first transport line portion, an upper and a lower guide rail, which predetermine the curve path of at least the first transport line portion, and wherein the respective guide finger guides the container throughout in contact with the upper guide rail, over the entire longitudinal extension of the first transport line portion.

According to a further advantageous embodiment variant, provision can be made in this situation for the first transport line portion comprises a plurality of transfer curve portions, of which the curvature directions in the handling direction differ from one another, in particular with a left-side curvature in the first transfer curve portion, with a right-side curvature in the second transfer curve portion, and then again with a left-side curvature in the third transfer curve portion.

According to yet another advantageous embodiment variant, provision can be made in this situation for the first transport line portion to comprise, in the region of its plurality of transfer curve portions, an adjustable curve path, which in particular is configured such as to be adjustable by means of at least one adjustment device, in a manner controlled and/or regulated by means of a motor.

According to yet another advantageous embodiment variant, provision can be made in this situation that at least one transfer curve portion of the first transport line portion is configured as a clothoid section and/or a Bloss curve section.

According to yet another advantageous embodiment variant, provision can be made in this situation for the transition curve sections of the first transport line portion is adjusted in such a way that, before reaching the second transport line portion, the respective container is force guided entirely in a transport pocket of the respective guide finger, allocated to the second guide portion.

According to yet another advantageous embodiment variant, provision can be made in this situation for the first guide section to form a first contact surface and the second guide section to form a second contact surface, which are each provided for the continuous contact locating of the outer casing surface of the respective container.

According to yet another advantageous embodiment variant, provision can be made in this situation for the respective guide finger to be formed as one part, in particular as one single piece.

According to yet another advantageous embodiment variant, provision can be made in this situation for the respective guide finger to be hardened at least in the region of its first and/or second contact surface.

Container-handling apparatus according to any one of the preceding claims, characterised in that the respective guide finger is configured in the form of a prism with a triangular base surface.

Container-handling apparatus according to any one of the preceding claims, characterised in that the side surface, leading when seen in the handling direction, is assigned to the first and second guide sections with the first and second contact surfaces.

Container-handling apparatus according to any one of the preceding claims, characterised in that the first contact surface is configured as planar, i.e. flat, and is oriented in relation to the upper guide rail in such a way that, at every point of time of the conveying of the respective guide finger along the first transport portion, the first contact surface encloses an acute angle with the upper guide rail.

Container-handling apparatus according to any one of the preceding claims, characterised in that, immediately adjacent to the first contact surface, the second contact surface of the second guide section connects to the first with a smoothly configured transition, which is preferably configured as a concave transport pocket.

Container-handling apparatus according to any one of the preceding claims, characterised in that the respective transport pocket, in the form of a circular arc, of a corresponding guide finger engages around the corresponding outer circumference of a container at least over part of the circumference at the periphery of the outer casing surface of the container.

Container-handling apparatus according to any one of the preceding claims, characterised in that the conveying means are configured as a conveyor chain, controlled and/or regulated by a motor, and driven such as to be endlessly circulating.

Container-handling apparatus according to any one of the preceding claims, characterised in that a plurality of guide fingers are arranged at the conveying means in a secure but detachable manner, and which are designed as identical to one another.

Container-handling apparatus according to any one of the preceding claims, characterised in that the container-handling apparatus comprises a filling machine and/or a closing device, wherein the second transport line portion is provided immediately adjacent to the closing device.

According to a further advantageous embodiment variant, the container-handling device can in this situation comprise a filling machine and/or a closing device.

The term "clothoid" in the meaning of the invention is understood to mean a curve of which the curvature constantly increases in linear fashion. In this situation, the product of the curve radius and the arc length of the curve forms a constant. In other words, the curvature at each point of the curve is proportional to the length of its arc up until this point.

The term "container" in the meaning of the invention is understood to be any container, in particular bottles, cans, beakers, etc., in each case made of metal, glass, and/or plastic, preferably of PET (polyethylene terephthalate).

The expression "essentially" or "approximately" signifies in the meaning of the invention deviations from the respective exact value by +/−10%, preferably by +/1 5%, and/or deviations in the form of changes which are not of significance for the function.

Further embodiments, advantages, and possible applications of the invention also derive from the following description of exemplary embodiments and from the Figures. In this situation, all the features described and/or represented in images are in principle the object of the invention, individually or in any desired combination, regardless of their relationships in the claims or references to them. The contents of the claims are also deemed to be constituent parts of the description.

The invention is explained in greater detail hereinafter on the basis of the Figures and in relation to exemplary embodiments.

DETAILED DESCRIPTION OF THE INVENTION

Identical reference numbers are used in the Figures for elements of the invention which are the same or have the same effect. Moreover, for the sake of easier overview, only reference numbers are represented in the individual Figures which are required for the description of the respective Figure.

Figure 1:
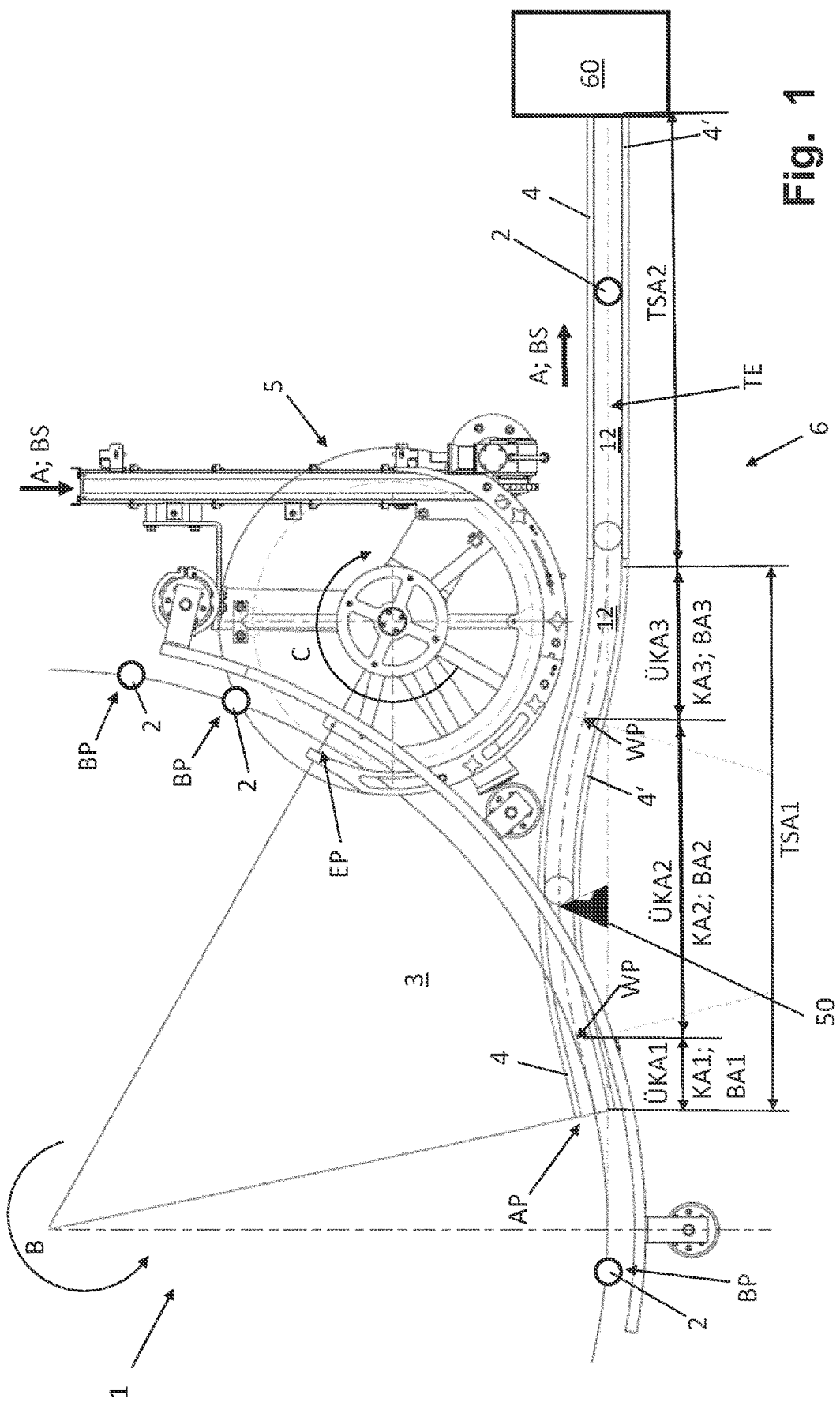
FIG. 1 By way of example and in a schematic view from above, a partially represented filling machine for filling cans or similar containers with liquid filling product.

The container-handling apparatus designated in general by 1 in FIG. 1 is configured in this case as a filling machine, and serves in particular for the pressure filling of containers 2 in the form of cans with a liquid filling product, for example with beer or soft drinks, along a container handling line BS running in a handling direction A.

The filling machine 1 is configured as being of the circulating type, with a rotor 3, represented only in sections, which during the filling operation is driven such as to circulate in a direction of rotation B about a vertical machine axis MA, and comprises at its circumference a plurality of handling positions BP, which are provided distributed, at the same or approximately the same angular distances, around the full circumference about the machine axis MA in the region of the outer circumference of the rotor 3 (wherein, by way of example, only a few of the handling positions BP are shown in the Figures). In this situation, the handling or treatment, in particular the filling of the containers 2 with liquid product, can take place at the handling positions BP.

In this situation, the container-handling apparatus according to the invention comprises at least one first transporter 5, the rotor 3, downstream of the first transporter 5 in the handling direction A and with the plurality of handling positions BP for handling the containers 2, and a second transporter 6, again downstream of the rotor 3 in the handling direction A.

In greater detail, the containers 2 which are to be filled are transferred via the first transporter 5, configured as a container infeed, to the rotor 3, circulating about the machine axis MA. In particular, for this purpose the first transporter 5 can be configured as an infeed star, rotating in the direction of rotation C. Accordingly, the direction of rotation C of the first transporter 5 is configured as counter-directional to the direction of rotation B of the rotor 3. Moreover, the second transporter 6 is configured as a linear conveyor, in particular as a chain conveyor, by means of which the containers 2, handled and treated at the plurality of handling positions BP of the rotor 3 and still not closed, are taken over by means of guide fingers 50 of the second transporter 6, and can be conveyed onwards in the manner still to be described in greater detail.

In this situation, a handling region in the form of a pitch circle, with a handling curve length, is located between the infeed point EP and an outfeed point AP of the circulating rotor 3, along which the plurality of handling positions BP are formed, at which the containers 2 are handled and treated, in particular filled with liquid filling product.

In particular, the second transporter 6, configured as a container infeed, can be provided for this purpose, which then convey the cans 2, already filled but not yet closed, after leaving the rotor 3, further along the container handling line BS in the handling direction A.

Following this, the containers 2, which in particular are in the form of cans, can be handed over at a closing device 60, represented only in rough schematic form, in particular to a can closing device, and there are closed in a manner known to the person skilled in the art. In the context of the container-handling apparatus being divided into blocks, the closing device 60 can be configured as a part or constituent component of the filling system, and therefore of the filling machine 1.

The filling of the cans 2 takes place in particular in the angle region of the rotational movement of the rotor 3 between the infeed point EP and the outfeed AP, which for this purpose are arranged with their container axes parallel to the machine axis MA, and coaxially or essentially coaxially with in each case an axis FA of the container handling position BP, configured as a filling position FP.

This process is described hereinafter for rotating filling machines at a filling element 7, provided by way of example, but, by analogy, this can also be used with linear fillers, and it is also possible, for example, for large PET containers for beer, referred to as kegs, to be filled in this way.

Figure 2:
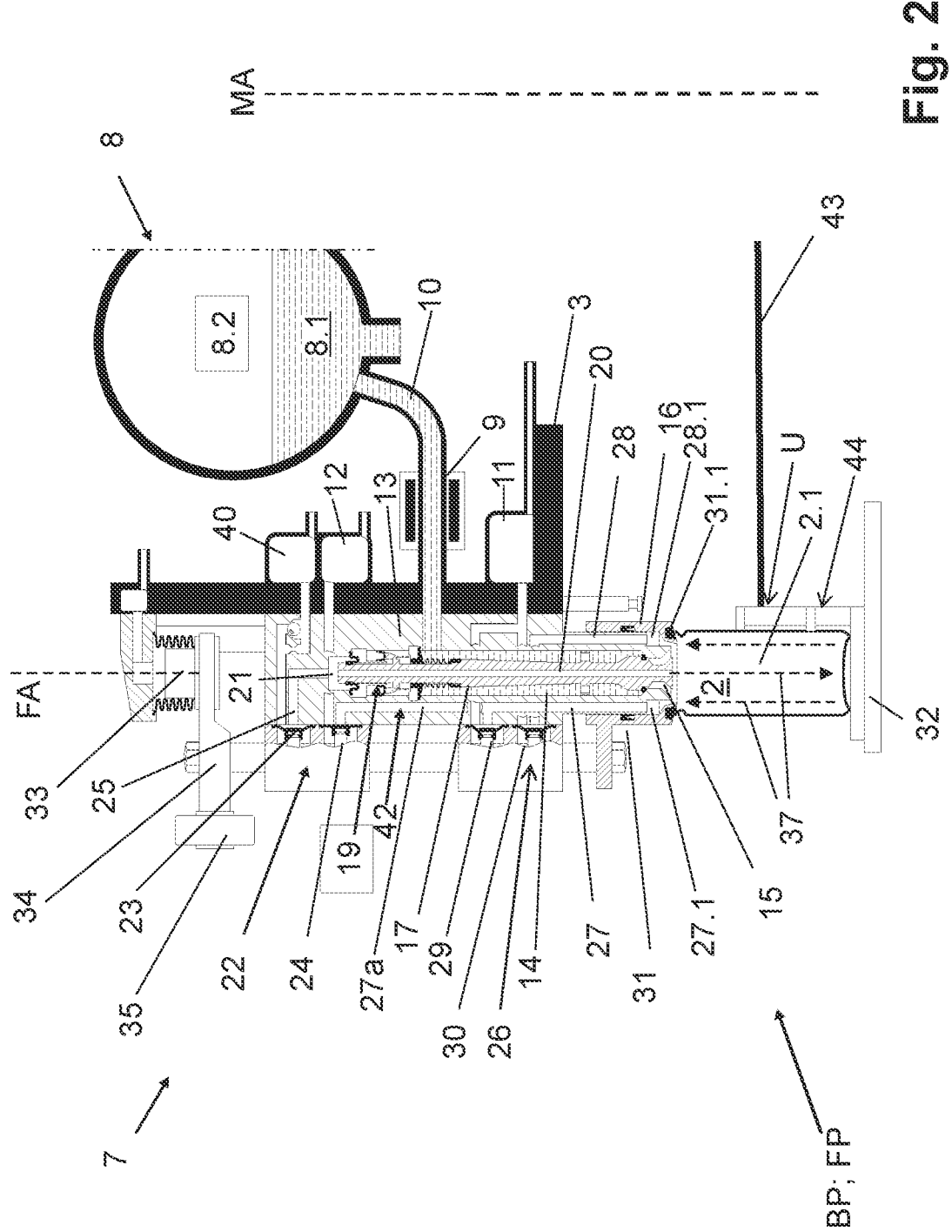
FIG. 2 By way of example and in a simplified representation, a possible embodiment variant for a filling position of the filling machine according to FIG. 1, with a can arranged in a sealed position at the filling element.
Figure 3:
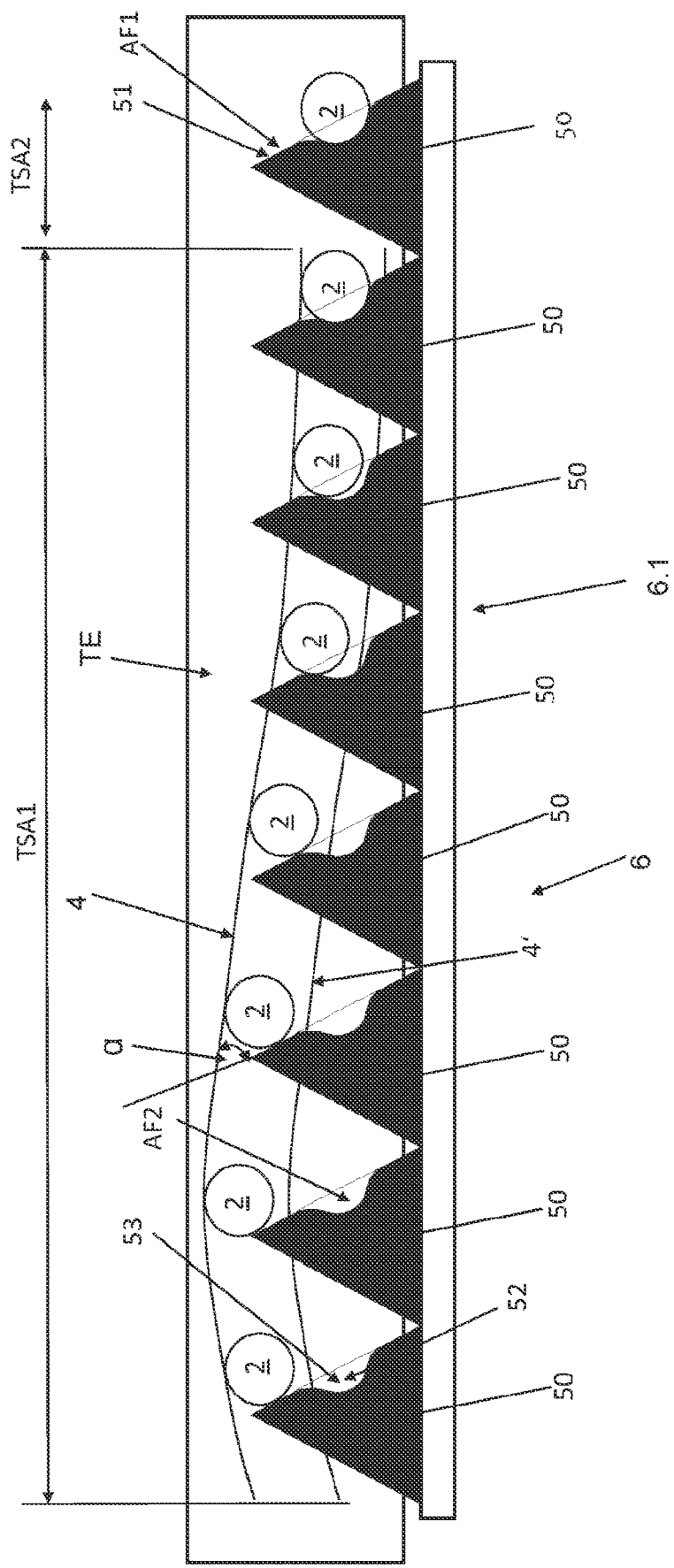
FIG. 3 By way of example and in a rough schematic view from above, a partial representation of the separate second transporter with containers being transported on it.
Figure 4:
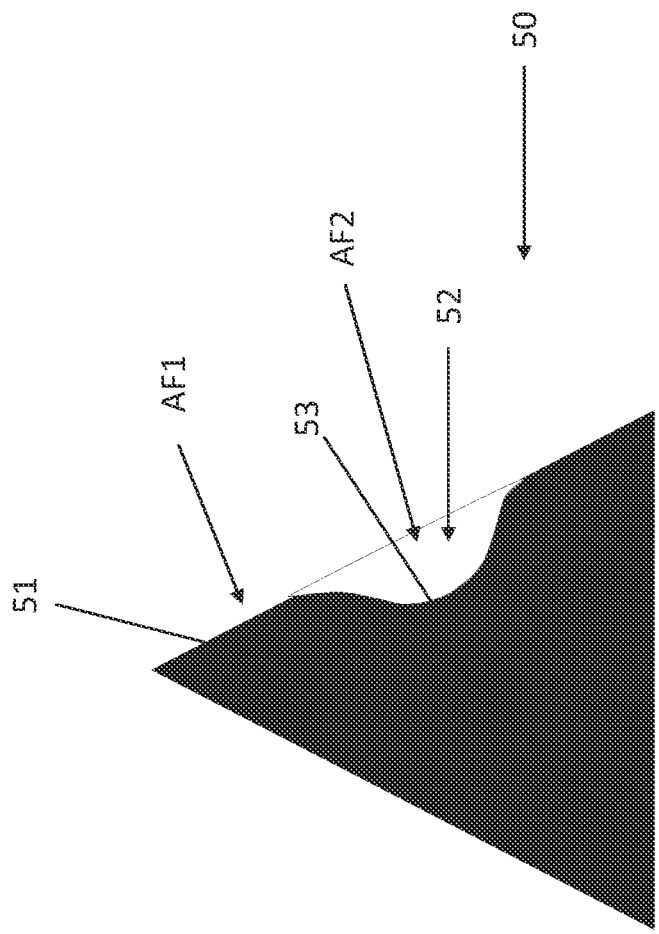
FIG. 4 By way of example and in a schematic view from above, a possible embodiment variant of a guide finger shown in isolation.

In this situation, shown by way of example in FIG. 2 is the structure of the filling element 7 of a handling position BP, configured as a filling position FP. In particular, however, the present invention is to be expressly understood as not being restricted to the structure of a filling element 7 and/or filling machine 1, as shown in FIG. 2. Rather, the container-handling apparatus 1 can also be configured as a closing device. Such closing devices are known to the person skilled in the art, for example, from DE 10 2009 017 109 A1. In this context, the holding plate 16, described in DE 10 2009 017 109 A1, can be compared in technical terms with the rotor 3 of the present invention, provided at which there are, in this case, a plurality of container handling positions BP configured as closing positions.

In this situation, every container handling position BP comprises essentially a filling element 7, which, together with the filling elements 7 of the other container handling positions BP, is arranged at the circumference of the rotor 3, and therefore forms the filling system of the filling machine 1. Also located at the rotor 3 is a filling product tank 8, common to all the container handling positions BP, and which, in the embodiment variant represented, is formed as a ring tank, which during the filling operation is partially filled with the liquid filling product, and specifically with the forming of a lower liquid chamber 8.1 for the filling product, and a gas chamber 8.2, which is filled by an inert gas, such as $CO_2$ or nitrogen, under a filling pressure of, for example, 3 bar to 5 bar. Each filling element 7 is connected to the liquid chamber 8.1 by means of an individual product line 10, comprising a flowmeter 9.

In the embodiment represented, additionally provided at the rotor 3 are three ring channels, surrounding the machine axis MA and common to all the container handling positions BP or filling elements 7, namely a first ring channel 11, a second ring channel 12, and a third ring channel 40. The first ring channel 11 serves as a return gas collection channel for conveying gas away from the respective filling element 7, in particular also at the flushing and/or relaxing the pressure of the containers 2.

The second ring channel 12 can serve as a return gas collection channel, in which at least part of the flushing and/or pressure-relieving gas, used during the flushing and/or pressure relieving phase, is conveyed away in order to be reused, at least in part, for the preliminary flushing of the interior of the container 2.1.

During the filling operation, in the manner described in greater detail hereinafter, the third ring channel 40 conveys the inert gas under pressure, for example $CO_2$ or nitrogen. The pressure in the first ring channel 11 is, for example, atmospheric pressure or a negative pressure, while a slight overpressure prevails in the second ring channel 12, which can correspond essentially to the flushing and/or relieving pressure of, for example, 0.2 to 0.5 bar. The pressure in the third ring channel 40 is equal or essentially equal to the filling pressure in the gas chamber 8.2, or slightly less than this filling pressure.

The filling element 7 comprising a filling element housing 13 with a liquid channel 14, which is connected by its upper region to the product line 10, and on the under side of the filling element 7 forms a ring-shaped dispensing opening 15, surrounding the axis FA concentrically, by means of which the liquid filling product can be conveyed to the respective container 2 during the filling. In the liquid channel 14, in the flow direction of the filling product, a liquid valve 16 is provided before the dispensing opening 15, which is formed essentially by a valve body 18 arranged at a valve tappet 17.

In FIG. 2, the liquid valve 16 is represented in the closed state, in which the valve body 18 is in contact against a valve surface, configured as a sealing surface, in the liquid channel 14. In order to open the liquid valve 16, the valve body 18, with the valve tappet 17, arranged coaxially with the axis FA, is raised by means of a pneumatically-controlled actuation element 19. The valve tappet 17 is configured as a gas pipe, and specifically with a gas channel 20, which is arranged coaxially with the axis FA on the under side, open in the region of the dispensing opening 15 and surrounded by this in ring fashion, and opens out at the upper end of the valve tappet 17 into a gas chamber 21 formed in the filling element housing 13.

In order to control the different phases of the filling process during the pressure filling of a container interior 2.1 of the respective containers 2, a plurality of controllable gas paths are formed in the filling element housing 13.

By way of a first controlled gas path 26, which is formed in the filling element housing 13, two return gas openings 27.1 and 28.1 can be connected to the first ring channel 11. The return gas openings 27.1 and 28.1 are provided in each case on the under side of the filling element 7, and specifically opposite the dispensing opening 15, offset radially outwards in relation to the axis FA, and also in the direction of the axis FA axially above the dispensing opening 15. In the embodiment represented, the return gas openings 27.1 and 28.1 are arranged offset by 180° about the axis FA, and form the lower openings or sections of gas channels 27 and 28, which, in the filling element housing 13, extend upwards from the respective return gas opening 27.1 and 28.1 respectively, parallel or essentially parallel to the axis FA. The gas channels 27 and 28 are part of the first controlled gas path 26, and each contain a control valve 29 and 30 respectively. In the embodiment represented, the control valves 29 and 30 are, in turn, pneumatically actuatable valves. The inlets of the control valves 29 and 30 are in each case connected to a return gas channel 27 and 28 respectively. The outlets of both control valves 29 and 30 are connected to the first ring channel 11.

By means of a second controllable gas path 42, which is likewise provided in the filling element housing 13, the return gas opening 27.1 can be connected to the second ring channel 12. In this situation, the second gas path 42 makes use, from the return gas opening 27.1, of the gas channel 27 of the first gas path 26, which branches off before the control valve 29 into the gas channel 27a, but is in fluid connection with the gas channel 27. Furthermore, the second controllable gas path 42 makes provision for a control valve 24, which can be pneumatically actuated. In this situation, the inlet of the control valve 24 is in fluid connection with the gas channel 27a, and the outlet is in fluid connection with the second ring channel 12.

By means of a controllable gas path 22, the gas chamber 21 can be connected in a controlled manner to the third ring channel 40. This third gas path 22 also contains a control valve 23, which is arranged in the connection between the third ring channel 40 and the gas chamber 21, and is connected via a gas channel 25 to the gas chamber 21. In this situation, the control valve 23 can also be configured as a pneumatically actuated valve.

The filling element 7 further comprises a centring tulip 31, which, at least during the flushing, pre-tensioning, and at the filling, is in contact with sealing effect, with a ring seal 31.1, against the opening edge of the container 2, standing upright on a container carrier 32, such that a space is formed which is sealed towards the outside environment by the filling element 7, the centring tulip 31, and the container 2, into which there open the dispensing opening 15, the lower end of the gas channel 20, and also the return gas openings 27.1 and 28.1. Furthermore, the container 2 is tensioned by means of the lowered centring tulip 31, i.e. held in place. By means of a pneumatic actuation element 33, in the form of, for example, a folding bellows subjected to the filling pressure, the centring tulip 31 will be subjected, by means of a linkage 34, to preliminary tension in its lower position, sealed tight against a container 2. By the interaction of a curve roller 35, provided at the linkage 34, with an outer lifting curve element, not circulating with the rotor 3, the centring tulip 31 is raised, for the purpose of pushing of a container 2 into the filling position FP or, respectively, for the removal of the filled container 2 from the filling position FP.

In particular, with the further conveying of the containers 2 from the rotor 3 of the filling machine 1 onto the second transporter 6, following in the transport direction A, after leaving the start point SP of the ejecting movement from the transport pocket 44 of the transport element 43 of the filling machine 1, there is a change of curvature in the movement path of the containers 2, still not closed, and therefore a change of the centripetal acceleration taking effect on the containers 2. The start point SP of the ejecting movement is understood to be that moment at which the container 2 begins to move out of the respective transport pocket 44 of the filling machine 1.

In this situation, the containers 2, still not closed, during the leaving of the filling machine 1, are held by guide fingers 50 or chain conveyors of the second transporter 6, downstream of the filling machine 1, and are then moved, in particular pushed, by these guide fingers 50 on the second transporter 6 in the direction of the closing device 60.

In greater detail, the containers 2 can be actively moved, by a corresponding guide finger 50, standing upright on their container bases, on a transport plane TE of the second transporter 6, in such a way that the containers 2 are always in contact with their outer casing surface with a guide finger 50, and at the same time are positioned correctly for division distribution.

According to the invention, the second transporter 6 is configured for this purpose as conveying means 6.1, driven as endlessly circulating, preferably as a chain conveyor. The conveying means 6.1 comprise at least one guide finger 50, which is moved together with the conveying means 6.1, which guide finger comprises a first and a second guide portion 51, 52. In this situation, the conveying means 6.1 can be configured as a motor controlled and/or regulated conveyor chain, driven such as to circulate endlessly, arranged at which are a plurality of guide fingers 50, with in each case a first and second guide portion 51, 52.

The plurality of guide fingers 50 arranged at the conveying means 6.1 can in this situation be configured as identical to one another. In particular, provision can be made for the guide fingers 50 to be arranged at the conveying means 6.1 securely but in a detachable manner.

In this situation provision can be made for the conveying means 6.1 to be formed laterally along the whole longitudinal extension of the second transporter 6, circulating with it, i.e. comprising the complete conveying length of the second transporter 6 of the handling line BS. The conveying means 6.1 can be driven by a motor, not represented in greater detail, such as an electric motor, and in particular a torque motor.

In this situation, a respective guide finger 50 takes over the containers 2, handled and treated at the plurality of handling positions BP of the rotor 3 and still not closed, with the first guide portion 51, and guides the containers 2 initially along a first transport path portion TSA1, which is curved at least in sections, of the second transporter 6, continuously in contact with a guide rail 4, 4' in the handling direction A. The guide rails 4, 4' are in this situation provided at least along the first transport path portion TSA1 of the second transporter 6, on both sides of the handling path BS.

Formed between the two guide rails 4, 4' is a channel 12, delimited laterally on both sides by the guide rails 4, 4', which predetermines the curve path of the first transport path portion TSA1. In greater detail, the guide rail consists of an upper guide rail 4 and a lower guide rail 4', between which the channel 12 is formed. In this situation, the width of the channel 12 is adjusted in such a way that it is formed as slightly wider than the diameter of the containers 2, for example 1% to 10% wider. The two guide rails, i.e. the upper and lower guide rails 4, 4' define in this situation the movement path predetermined by the curved first transport path portion TSA1, through which a container 2 must run.

Preferably, the respective guide finger 50 guides the corresponding container 2 with the first guide portion 51 in continuous contact with the upper guide rail 4 over the entire longitudinal extension of the first curved transport path portion TSA1.

In this situation, the first transport path portion TSA1 is formed in particular by a plurality of transfer curve portions ÜKA1, ÜKA2, ÜKA3. Conversely, the second transport path portion TSA2 can be formed as straight, i.e. linear, which is delimited laterally in this path portion by two guide rails 4, 4' running parallel to one another. In the second transport path section TSA2, the channel 12 is also formed between the upper and lower guide rails 4, 4'.

In particular, provision can be made for the curvature direction of the transfer curve portions ÜKA1, ÜKA2, ÜKA3 to be formed as different from one another.

On observing the first transport path portion TSA1 in the handling direction A of the containers 2, the first transfer curve portion ÜKA1, in the exemplary embodiment shown, is curved to the left, the second transfer curve portion ÜKA2 is curved to the right, and the third transfer curve portion ÜKA3 is again configured as curved to the left.

In this situation, the first transport path portion TSA1 is configured in the region of the plurality of transfer curve portions ÜKA1, ÜKA2, ÜKA3 as an adjustable curve path, which is configured, for example by means of at least one adjustment device, not represented in greater detail, which can be adjusted by a motor in a controlled and/or regulated manner.

As can be seen in particular in FIG. 1, during their transport the containers 2 are guided at least along the first transport path portion TSA1 in a channel 12, delimited on both sides by means of the upper and lower guide rails 4, 4', in greater detail in contact with the upper guide rail 4', which predetermines the curve path of the at least one transfer curve portion ÜKA1, ÜKA2, ÜKA3.

Preferably, the channels 12 of the first transport path portion TSA1 are flush, in the transfer region to the second transport path portion TSA2, with the guide rails 4, 4' of the second transporter 6.

In this situation, the curve path, which is predetermined by the guide rails 4, 4' of the at least one transfer curve portion ÜKA1, ÜKA2, ÜKA3, is configured such as to be adjustable by means of a motor, by way of the at least one adjustment device.

Further advantageously, at least one transfer curve portion ÜKA1, ÜKA2, ÜKA3 of the first transport path portion TSA1 is configured as a clothoid section KA1, KA2, KA3 and/or as a Bloss curve section, the course of which is selected as being in the form of a clothoid or a Bloss curve respectively.

In the exemplary embodiment shown, of FIG. 1, the first transport path portion TSA1 comprises three clothide portions KA1, KA2, KA3. In this situation, the first transfer curve portion ÜKA1 is configured as a clothoid section KA1, the second transfer curve portion ÜKA2 is configured as a clothoid section KA2, and the third transfer curve portion ÜKA3 is configured as a clothoid section KA3.

In the exemplary embodiment shown in FIG. 1, the clothoid section KA2 connects directly to the first clothoid section KA1, to which the third clothoid section KA3 connects directly in turn. The individual clothoid sections KA1, KA2, KA3 are in this situation in each case connected by a turning point WP, at which a change of curvature takes place along the first transport path portion TSA1, i.e. the curvature of the first transport path portion TSA1 changes at the turning point WP, for example from right curvature to left curvature.

The clothoid portions KA1, KA2, KA3 exhibit their origin in each case at the turning point WP, i.e. it is there that they have a curvature radius R=∞ (designated hereinafter as the clothoid radius), i.e. the clothoid portions KA1, KA2, KA3 transition into one another free of any curvature at the turning point WP. In other words, the curvature change, i.e. the direction of cuvature, takes place at the turning point WP. The curvature radius then becomes greater with the rising arc length in the direction away from the origin or turning point WP respectively.

As an alternative to the course shown in FIG. 1, the first transport path portion TSA1 can exhibit a straight transport path region between the clothoid portions KA1, KA2, KA3 between the transition curve portions ÜKA1, ÜKA2, ÜKA3, formed as clothoid portions KA1, KA2, KA3. The formation of the first transport path portion TSA1 can therefore be selected accordingly, dependent on the respective circumstances such as the diameter of the transporters 5 or of the rotor 3.

In the foregoing embodiments, a type of transition curve in the form of a clothoid or clothoid curve has been described. As an alternative, and by analogous application, it is also possible to provide for another suitable transition arc, with a curvature change free of any kinks and constantly increasing or decreasing, in particular a transition curve in the form of a Bloss curve or Bloss curve portion. Combinations of a Bloss curve/Bloss curve portion and a clothoid or a clothoid portion respectively are in principle also conceivable. Polynomes and trigonometric functions can also be used.

Provision can be made in this situation for at least one transition curve portion ÜKA1, ÜKA2, ÜKA3 of the first transport path portion TSA1 to be configured as a curve, which has been created by polynomes. As an alternative or in addition, provision can be made for at least one transition curve portion ÜKA1, ÜKA2, ÜKA3 of the first transport path portion TSA1 to be formed as a curve which has been produced by trigonometric functions.

Provision can therefore be made for at least one transition curve portion ÜKA1, ÜKA2, ÜKA3 of the first transport path portion TSA1 to be formed as a clothoid portion and/or Bloss curve portion BA1, BA2, BA3.

As has already been described, the second transport path portion TSA2 is configured as straight, i.e. linear, and in this situation advantageously extends as far as the closing device 60.

In this situation, the respective container 2 is conveyed onwards on the second transport path portion TSA2 by means of the second guide portion 52 of a corresponding guide finger 50 in a defined position, and specifically preferably as far as a closing device 60.

In this situation likewise, the first guide portion 51 forms a first contact surface AF1 for the locating in firm contact of the outer surface of the respective container 2, and the second guide portion AF2 forms a second contact surface AF2, likewise for the firm contact of the outer surface of the corresponding container 2.

In particular, the guide finger 50 can be configured in this situation as one part, for preference as one piece, and can in particular be manufactured from a metallic material, such as special steel or stainless steel.

In this situation, likewise, provision can be made for the guide finger 50 to be hardened, at least in the region of its first and/or second contact surfaces AF1, AF2.

In this situation, the respective guide finger 50 can be configured essentially in the form of a prism with a triangular base surface. The respective guide finger 50 is then secured by one of its side surfaces to the endlessly circulating conveying means 6.1. The leading side surface, seen in the handling direction A, is in this case assigned to the first and second guide portions 51, 52 with the first and second contact surfaces AF1, AF2.

In particular, the first contact surface AF1 extends from the tip of the leading side surface over about a third of the total length of this leading side surface. Preferably, the contact surface AF1 is configured as planar, i.e. flat.

In this situation, the contact surface AF1 of the first guide portion 51 is oriented in relation to the upper guide rail 4 in such a way that, at every moment of the conveying of the respective guide finger 50 along the first transport path portion TSA1, the first contact surface AF1 encloses an acute angle α with the upper guide rail 4. It is therefore ensured that, at every moment of the conveying of the containers 2 along the first curved transport path portion TSA1, the respective container 2 is pressed by the first guide portion 51 of the guide finger 50 in firm contact with the upper guide rail 4, and in its direction respectively, and is therefore conveyed precisely on the specified movement path through the plurality of transition curve portions ÜKA1, ÜKA2, ÜKA3.

Following immediately adjacent to the first flat contact surface AF1, with a smooth flat transition, is the second contact surface AF2 of the second guide portion 52, which is preferably provided as a concave transport pocket 53.

In this situation, likewise, the transition curve portions ÜKA1, ÜKA2, ÜKA3 of the first transport path portion TSA1 are arranged in such a way that, immediately before reaching the second transport path portion TSA2, the respective container 2 is force-guided completely into the transport pocket 53 of the respective guide finger 50.

The respective transport pocket 53 of a corresponding guide finger 50 in this situation engages in an arc shape around at least a part the corresponding outer circumference of a container 2, as well as in firm contact with a part circumference of the outer casing surface of the container 2. In particular, the respective container 2 is guided in a defined position in the transport pocket 53, such that a container 2 which has been taken into the transport pocket 53 is transferred in the correct divisional arrangement and in the correct position to the closing device 60, downstream of the second transporter 6.

The invention has been described heretofore by way of exemplary embodiments. It is understood that a multiplicity of modifications or derivations are possible, without thereby departing from the scope of protection of the invention defined by the claims. The contents of the claims are declared to be the object of the description.

REFERENCE NUMBER LIST

1 Filling machine
2 Container
2.1 Container interior
3 Rotor
4, 4' Guide rail
5 Container infeed
6 Container outfeed
7 Filling element
8 Filling product tank
8.1 Liquid chamber
8.2 Gas chamber
9 Flowmeter
10 Product line
11 First ring channel
12 Second ring channel
13 Filling element housing
14 Liquid channel
15 Dispensing opening
16 Liquid valve
17 Valve tappet
18 Valve body
19 Actuating element
20 Gas channel
21 Gas chamber
22 Third controlled gas path
23 Control valve
24 Control valve
25 Gas channel
26 First controlled gas path
27, 28 Gas channel
27.1, 28.1 Return gas opening
29, 30 Control valve
31 Centring tulip
32 Container carrier
33 Actuation element
34 Rod
35 Curve roller
37 Flow of inert gas during flushing
40 Third ring channel
41 Pressure regulating device
42 Second controlled gas path
43 Guide element
44 Transport pocket
50 Guide finger
51 First guide portion
52 Second guide portion
53 Transport pocket
60 Closing device
α Angle
A Handling direction
AP Outfeed point
AF1, AF2 Contact surface
BS Container handling portion
BA1 First Bloss arc portion
BA2 Second Bloss arc portion
B Direction of rotation of the rotor 3
EP Infeed point
FA Filling element axis
BP Container handling position
MA Machine axis
SP Start point for ejecting movement
KA1, KA2 First/second clothoid portion
TSA1 First transport path portion
TSA2 Second transport path portion
ÜKA1 First transition curve portion
ÜKA2 Second transition curve portion
ÜKA3 Third transition curve portion
TE Transport plane
U Circumference
WP Turning point

The invention claimed is:

1. A container-handling apparatus, comprising:
a first transporter configured as a container infeed for containers;
a rotor arranged downstream of said first transporter in a handling direction and configured to rotate about a machine axis;
said rotor having a plurality of handling positions for handling the containers; and
a second transporter arranged downstream of said rotor in the handling direction and configured as a container outfeed, said second transporter having a first transport path portion which is curved, at least in sections thereof, and a substantially straight second transport path portion;
said second transporter being a chain conveyor with at least one guide finger mounted for movement with an endlessly circulating driven conveying means, said at least one guide finger having a first guide portion and a second guide portion;
said at least one guide finger being configured to take over a respective container, handled and treated at a handling position of said rotor and not yet closed, and to guide the container with said first guide portion initially along said first transport path portion continuously in firm contact with a guide rail in the handling direction, before said at least one guide finger conveys the container, by said second guide portion on said second transport path portion;
said first guide portion forming a first contact surface and said second guide portion forming a second contact surface, each provided for a firm contact engagement of an outer casing surface of the respective container; and said first contact surface being a flat planar surface, and said second contact surface of said second guide portion immediately adjoining said first contact surface, via a smooth transition, and forming a concave transport pocket.

2. The container-handling apparatus according to claim 1, configured as a filling machine for filling containers with a liquid filling product and transporting the containers along a container handling portion in the handling direction.

3. The container-handling apparatus according to claim 1, wherein said at least one guide finger is hardened at least in a region of said first contact surface and/or said second contact surface.

4. The container-handling apparatus according to claim 1, wherein said at least one guide finger is formed as a prism with a triangular base surface.

5. The container-handling apparatus according to claim 1, wherein said first and second guide portions with said first and second contact surfaces are formed on a leading side surface of said at least one guide finger, as seen in the handling direction.

6. The container-handling apparatus according to claim 1, wherein said concave transport pocket is formed in a circular arc that engages around a corresponding outer circumference of the container being transported, at least over a portion of a circumference at a periphery of an outer casing surface of the container.

7. The container-handling apparatus according to claim 1, wherein said conveying means is a conveyor chain, controlled by a motor and configured to be endlessly circulating.

8. The container-handling apparatus according to claim 1, wherein said at least one guide finger is one of a plurality of identical guide fingers that are detachably secured to said conveying means.

9. The container-handling apparatus according to claim 1, wherein the container-handling apparatus is a filling machine and/or a closing device, and said second transport line portion is disposed immediately adjacent said closing device.

10. The container-handling apparatus according to claim 1, wherein:

said second transporter comprises, at least within said first transport path portion, an upper guide rail and a lower side guide rail, which predetermine a curve path of said first transport path portion; and said at least one guide finger is configured to guide the corresponding container with said first guide portion continuously in firm contact with said upper guide rail over an entire longitudinal extension of said first transport path portion.

11. The container-handling apparatus according to claim 10, wherein said first contact surface is oriented relative to said upper guide rail such that, at all times during a conveying of said at least one guide finger along said first transport portion, said first contact surface encloses an acute angle with said upper guide rail.

12. The container-handling apparatus according to claim 1, wherein said at least one guide finger is configured in one part.

13. The container-handling apparatus according to claim 12, wherein said at least one guide finger is configured as a single piece.

14. The container-handling apparatus according to claim 1, wherein the first transport path portion is formed with a plurality of transition curve portions that differ from one another in respective curvature orientations in the handling direction.

15. The container-handling apparatus according to claim 1, wherein said plurality of transition curve portions includes a first transition curve portion that curves left-ward, a second transition curve portion that curves right-ward, and a third transition curve portion that again curves left-ward along the handling direction.

16. The container-handling apparatus according to claim 14, wherein said first transport path portion is formed to exhibit an adjustable curve path in a region of said plurality of transition curve portions, for adjustment via a motor-controlled and/or closed-loop controlled adjustment by at least one adjustment device.

17. The container-handling apparatus according to claim 14, wherein at least one of said transition curve portions of said first transport path portion is at least one of a clothoid portion or a Bloss curve portion.

18. The container-handling apparatus according to claim 14, wherein said transition curve portions of said first transport path portion are adjusted to cause the respective container, before reaching said second transport path portion to be force-guided completely in a transport pocket formed in said second guide portion of the respective said guide finger.

* * * * *